United States Patent
X et al.

(10) Patent No.: US 12,006,159 B2
(45) Date of Patent: Jun. 11, 2024

(54) SYSTEMS AND METHODS FOR DRONE MANAGEMENT

(71) Applicant: Verizon Patent and Licensing Inc., Basking Ridge, NJ (US)

(72) Inventors: X, Portland, OR (US); David A. Newell, Justin, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 595 days.

(21) Appl. No.: 17/241,331

(22) Filed: Apr. 27, 2021

(65) Prior Publication Data
US 2022/0340371 A1    Oct. 27, 2022

(51) Int. Cl.
*B65G 43/10*    (2006.01)
*G05B 19/416*    (2006.01)

(52) U.S. Cl.
CPC ........... *B65G 43/10* (2013.01); *G05B 19/416* (2013.01); *G05B 2219/45054* (2013.01)

(58) Field of Classification Search
CPC .................. B65G 43/10; G05B 19/416; G05B 2219/45054; B64U 80/40
See application file for complete search history.

(56) References Cited

U.S. PATENT DOCUMENTS

| | | | |
|---|---|---|---|
| 8,511,606 B1 * | 8/2013 | Lutke | B64U 70/93 320/109 |
| 9,701,425 B2 * | 7/2017 | Lee | B64C 39/024 |
| 9,776,717 B2 * | 10/2017 | Spinelli | B64F 1/222 |
| 10,974,911 B2 * | 4/2021 | Zevenbergen | B64U 70/95 |
| 11,673,689 B2 * | 6/2023 | X | B64F 1/36 244/114 R |
| 2009/0314883 A1 * | 12/2009 | Arlton | F41A 9/13 244/63 |
| 2015/0183326 A1 * | 7/2015 | Ryberg | B60L 53/00 320/109 |
| 2016/0144734 A1 * | 5/2016 | Wang | B60L 53/124 701/17 |
| 2017/0225802 A1 * | 8/2017 | Lussier | B64U 10/20 |
| 2019/0263538 A1 * | 8/2019 | O'Brien | B60L 53/31 |
| 2021/0197982 A1 * | 7/2021 | Sweeny | B60P 3/11 |
| 2021/0224739 A1 * | 7/2021 | Sweeny | G06Q 10/083 |
| 2022/0029438 A1 * | 1/2022 | Maurer | B60L 53/16 |
| 2022/0114536 A1 * | 4/2022 | Takizawa | B64D 1/22 |
| 2023/0257139 A1 * | 8/2023 | Straus | B64F 1/222 244/114 R |

\* cited by examiner

*Primary Examiner* — Patrick H Mackey

(57) ABSTRACT

A system includes a storage facility configured to store drones. The system may also include at least one robotic element configured to move the drones to and from the storage facility and a conveyor configured to move the drones to a launching area. The at least one robotic element may include an articulating arm configured to move a first drone from the storage facility to the conveyor, in response to identifying that the first drone is selected for a flight.

20 Claims, 11 Drawing Sheets

SYSTEMS AND METHODS FOR DRONE MANAGEMENT

BACKGROUND INFORMATION

The use of aerial drones, also referred to as Unmanned Aerial Vehicles (UAVs), is increasing. Drones themselves can be awkward to physically transport and manage due to their irregular shape, sensitive operational components (e.g., propellers, cameras) and potentially bulky size. Accordingly, drones are typically stored in some type of box, transported to a ground based launching area, removed from the box and launched. In order to launch a drone from a particular launching area/pad, a drone pilot or other personnel must manually remove the drone from its box, configure the drone for its mission (for example, install equipment, charge/swap battery power sources, load payloads), carry the drone to an appropriate area for launching, set the drone in the selected area for launching and repeat the process for each drone. When a drone mission is completed, personnel may need to remove equipment, payloads and power sources, and repackage the drone in its box for transport. Such processes are typically very time consuming and prone to configuration errors, damage to drones, injury to personnel and other negative consequences/side effects. In addition, the relatively short flight endurance of battery powered drones limits the total flight time and requires frequent recharging or battery swapping. If multiple drones are to be launched, the delays involved with these preparatory activities may limit the number of drones that can be launched in a period of time and increase delays associated with launching multiple drones.

DETAILED DESCRIPTION OF EXAMPLE EMBODIMENTS

The following detailed description refers to the accompanying drawings. The same reference numbers in different drawings may identify the same or similar elements.

Implementations described herein provide a system and platform for performing aspects of drone operations and management, and particularly for performing drone ground operations. For example, in one implementation, the system may include storage facilities to store a number of drones in a way that allows the drones to be inserted into and removed from storage automatically. The system may also provide for charging and fueling of drones, equipping and repairing of drones, and drone launch and landing/retrieval. In some implementations, aspects of drone management, such as drone handling and storage, preflight visual inspection, charging/fueling and drone launching and retrieval may be performed in an automated manner with little to no human intervention. In this manner, drone management and operations associated with drone flights may be simplified, and may allow multiple drones to be managed from a single location. This may allow more drones to be launched in a given period of time, resulting in more efficient use of the drones and the personnel associated with managing the drones. It may also allow for a variety of drones with differing payloads or capabilities to be deployed in order to accomplish multiple flight goals simultaneously, to provide multiple perspectives from various drones, or to transport multiple items for delivery to multiple locations.

Figure 1:
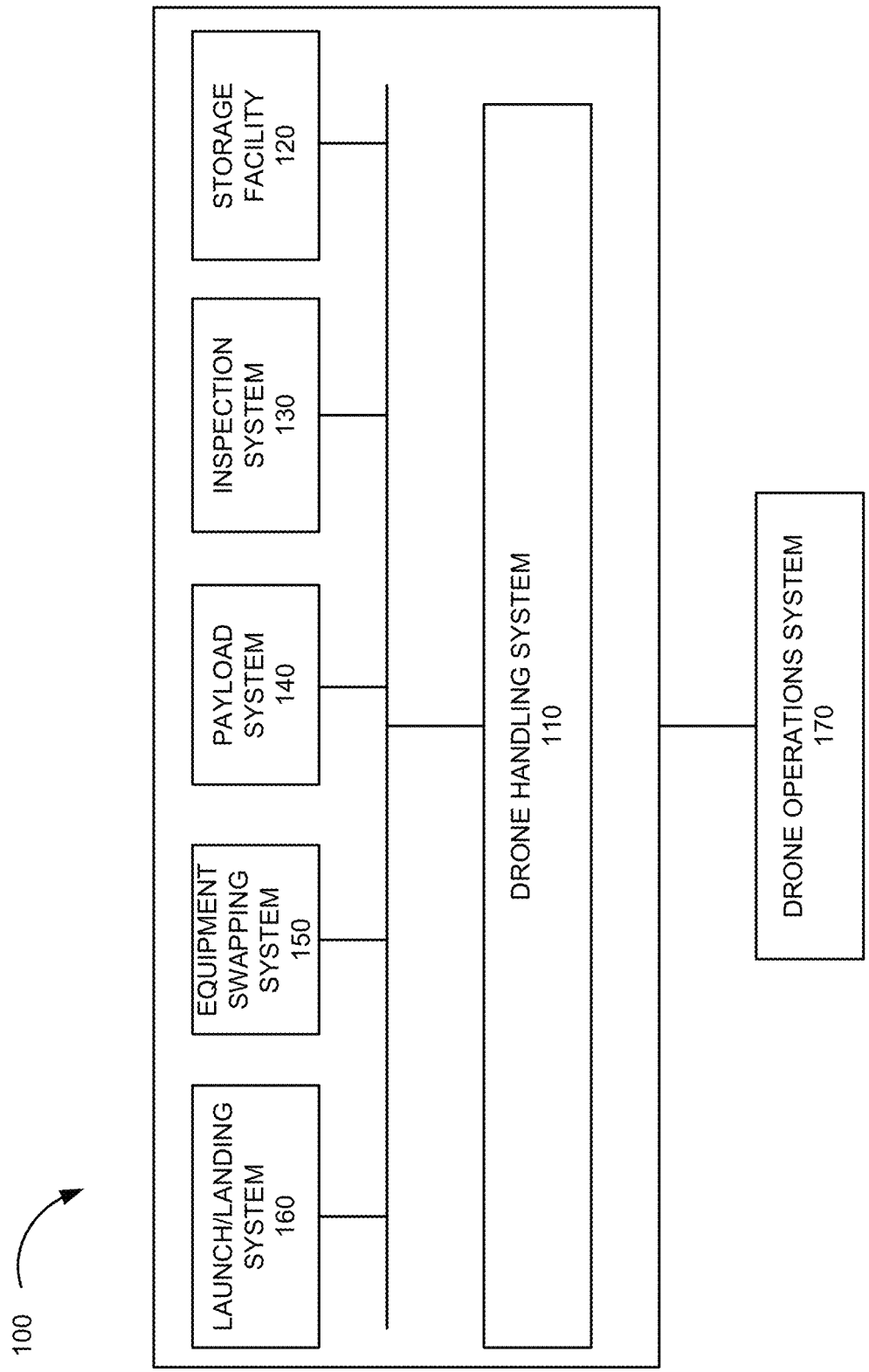
FIG. 1 illustrates an exemplary system in which systems and methods described herein may be implemented.

FIG. 1 is a diagram illustrating an exemplary system in which systems and methods described herein may be implemented. Referring to FIG. 1, system 100 includes drone handling system 110, storage facility 120, inspection system 130, payload system 140, equipment swapping system 150, and launch/landing system 160. A drone operations system 170 may provide control and monitoring of each of the system components through communications with each. It should be understood that system 100 may include other elements based on the implementation. It should also be understood that an implemented system 100 may omit certain of the components of FIG. 1 depending on implementation. For example, in some implementations a system 100 may be implemented without an inspection system 130, payload system 140 and/or equipment swapping system 150, Drone handling system 110 may include mechanical and computing components to move drones (not shown) through system 100, such as from storage facility 120 through inspection system 130, payload system 140, equipment swapping system 150 and to launch/landing system 160. In an exemplary implementation, drone handling system 110 may include one or more robots or robotic components, such as a robotic arm illustrated in FIG. 2A. Drone handling system 110 may further include actuators, sensors and communications circuitry to enable control and monitoring of drone handling system 110, for example, through drone operations system 170.

Figure 2A:
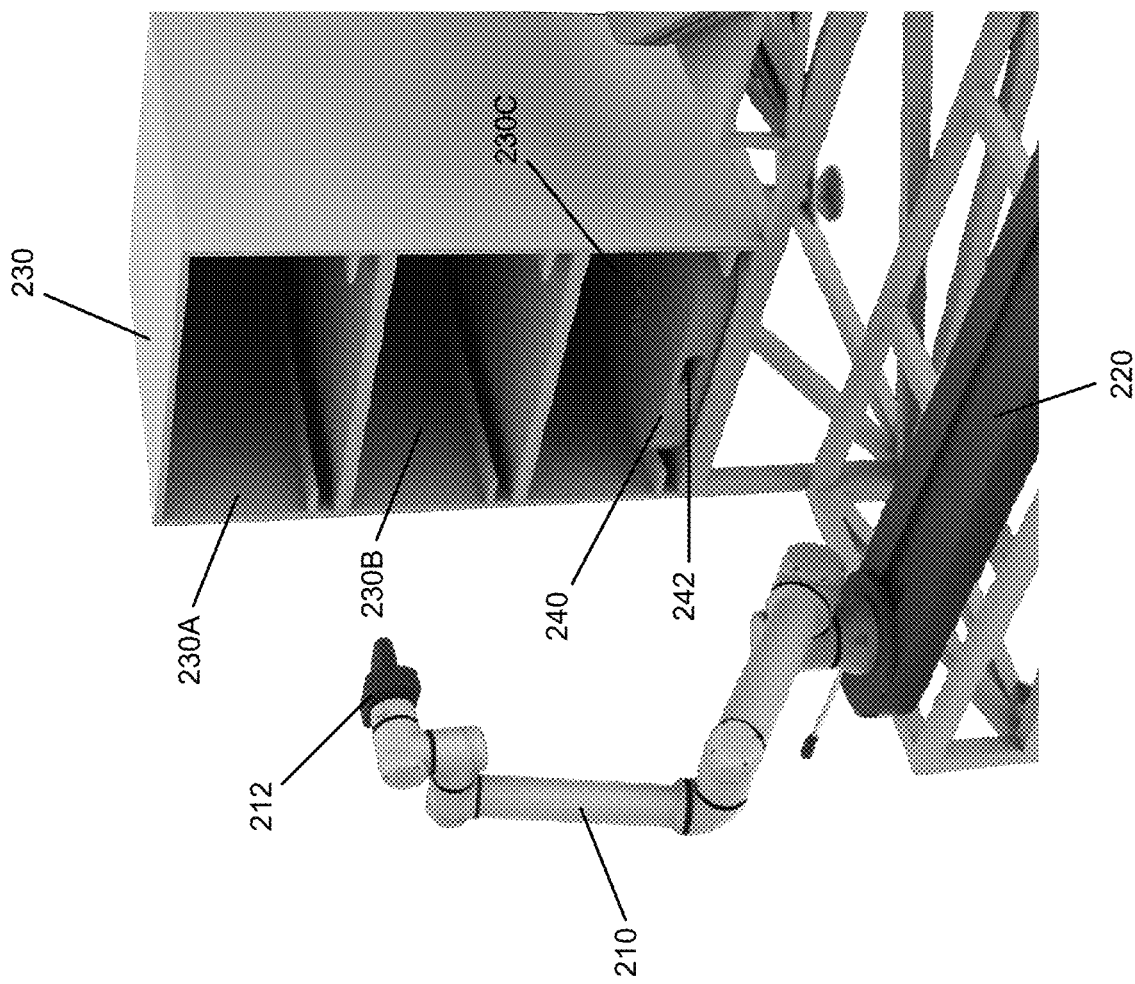
FIGS. 2A and 2B illustrate components implemented in portions of the system of FIG. 1 in accordance with an exemplary implementation.
Figure 2B:
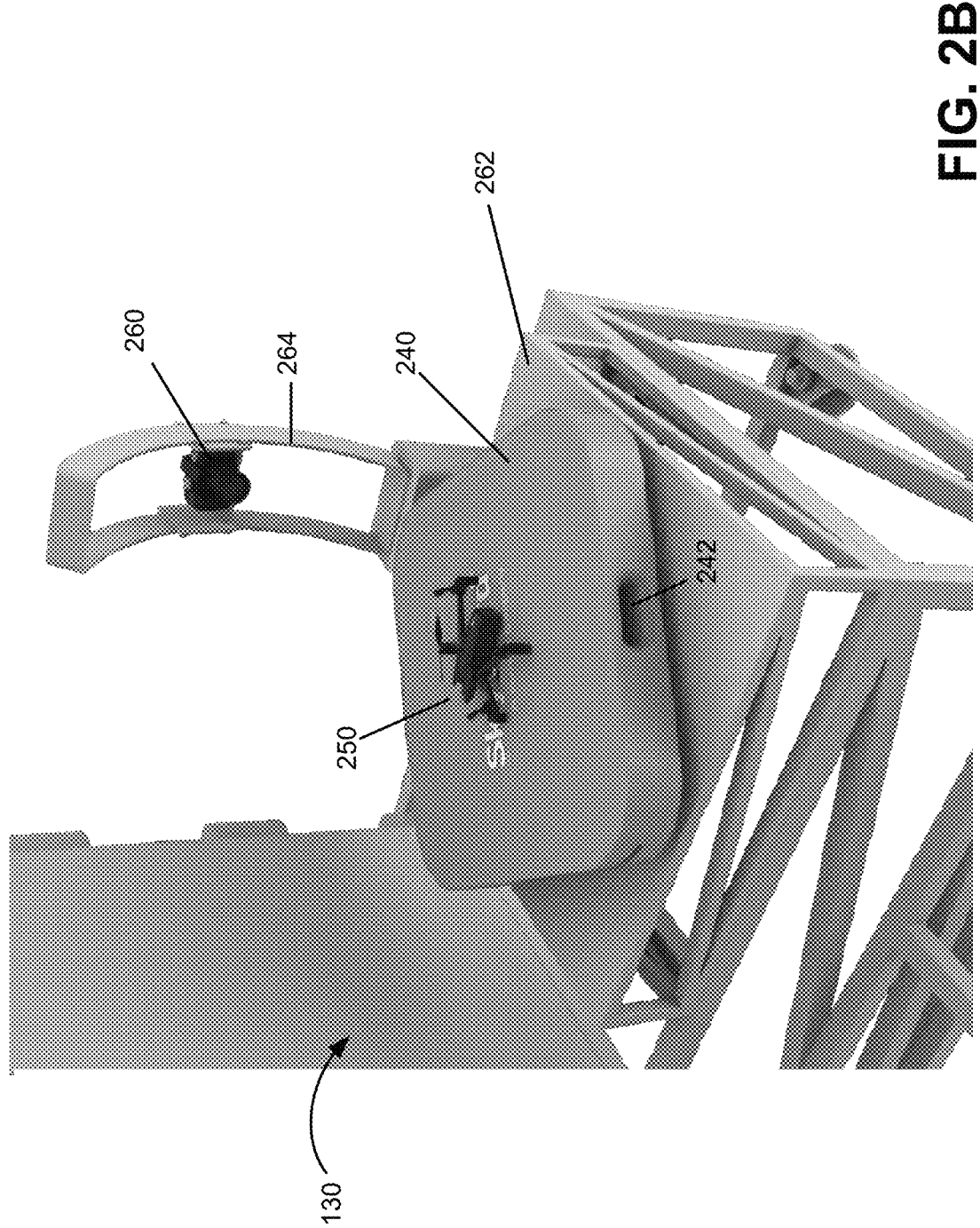

Referring to FIG. 2A, drone handling system 110 may include a robotic arm 210 having control hardware and multiple degrees of articulation to allow the arm to manipulate drones and/or drone carriers (also referred to herein a "platforms"). Robotic arm 210 may include an end 212 with an engagement mechanism that interfaces with drones or drone carriers that may be in a storage facility 120, such as a rack 230 in which drones are stored. In one implementation, drones may be placed on a platform 240 as a drone carrier and stored in rack 230, which may be beneficial to allow accommodation of drones having varying physical configurations. For example, FIG. 2A illustrates a platform 240 with an opening 242 designed to receive the end 212 of robotic arm 210. In this manner, robotic arm 210 may pick up platform 240 (which may be carrying a drone 250, as shown in FIG. 2B) and move platform 240 and drone 250 into and out of storage rack 230, as described in more detail below. In some implementations, platforms 240 may include retention areas, such as indentations, notches, sidewalls or ridges to receive the feet or lower portions of drones 250, to ensure that drones 250 do not slide off platforms 240 while in transit. Platforms 240, the feet of drones 250 and/or the lower portions of drones 250 contacting platforms 240 may also include non-skid surfaces to ensure that drones 250 do not slide off platforms 240 while in transit. Each platform 240 and/or drone 250 may also include identification information, such as an optical code, a radio frequency identifier (RFID) or some other identifier to allow drone handling system 110 (and/or other systems described herein) to track platforms 240 and/or drones 250, such as whether a platform 240 is stored in rack 230, whether platform 240 has been removed from rack 230, whether drone 250 is located at the inspection system 130 or launch/landing system 160, etc. Drone handling system 110 may include sensors that can read such identification information (e.g., optical scanners, RFID tag scanners, and the like). Drone handling system 110 may communicate with drone operations system 170 to communicate the identification information.

Storage facility 120 may include a storage system in which drones 250 are stored. For example, as illustrated in FIG. 2A, storage facility 120 may include a storage rack 230 with openings 230A, 230B and 230C that can each store a platform 240 and drone 250 placed on a platform 240. In other implementations, rack 230 may be a large rack including the capacity to store a large number of drones 250.

Figure 3:
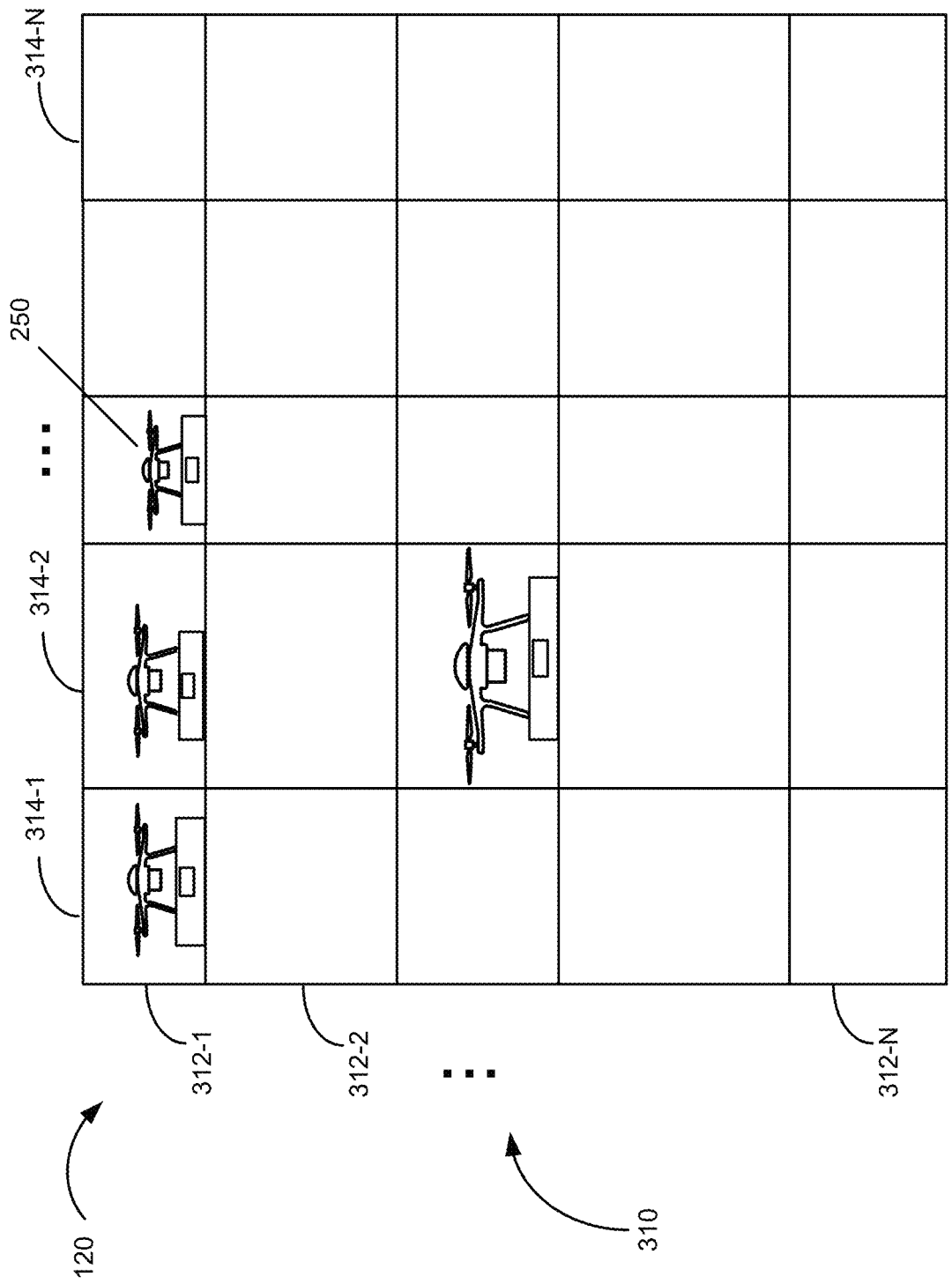
FIG. 3 illustrates an exemplary storage facility in accordance with an exemplary implementation.

As another example, FIG. 3 illustrates storage facility 120 which includes rack 310 with rows (e.g., rows 312-1 through 312-N) and columns 314 (e.g., columns 314-1 through 314-N) of openings to store drones 250 of various sizes. The size of openings in rack 310 may vary depending on the particular implementation. For example, column 314-1 may include relatively small openings with respect to width to store smaller drones 250, while column 314-2 may include larger openings to store larger drones 250. In some implementations, rack 310 may be adjustable such that the size of the openings may be adjusted with respect to both width and height as necessary based on the size of the particular drones 250 or drone platforms 240 being stored.

In some implementations, storage facility 120 may also include elements to add fuel to the fuel storage of drones 250 and/or recharge electric drones 250 that include batteries while drones 250 are stored. In an exemplary implementation, storage compartments of storage facility 120 may include a wireless (e.g., inductive) charging system which allows batteries within drones 250 to be wirelessly charged while drones are stored. In an exemplary implementation, storage facility 120 and/or drone handling system 110 may identify each drone 250 stored in storage facility 120 via, for example, an optical code, a radio frequency identifier (RFID) or some other identifier, and use the identifier to determine the charging and/or fueling requirements associated with that particular drone 250. Storage facility 120 may then be able to provide the appropriate charging and/or fueling for each drone 250. In other implementations, storage facility 120 may include interfaces, conduits and/or cables, such as a universal serial bus (USB) charging ports and cables or compressed gas hoses, to which drones 250 are connected while being stored to allow drones 250 to be fueled and/or charged while in storage. In each case, storage facility 120 may allow drones 250 to be fully fueled/charged while being stored.

In some implementations, storage facility 120 may include a monitoring system that allows for the detection of the contents of storage facility 120. For example, the monitoring system may include optical sensors (e.g., cameras, LIDAR), RF sensors (e.g., RFID scanners) or other sensors that can detect the presence of a platform 240/drone 250 in a location of storage facility 120. In some implementations, a machine vision facility may apply machine vision techniques to images from a camera system to identify one or more of: whether a location of the storage facility 120 is occupied or empty; a type of drone 250 that is occupying a location of storage facility 120, an identity of a drone 250 that is occupying a location of storage facility 120. Storage facility 120 may communicate with drone operations system 170 to provide storage information (e.g., location occupancy status, drone identifiers, etc.) from the monitoring system.

In some implementations of drone handling system 110, robotic arm 210 may be attached to a base portion that integrates with a track 220 (FIG. 2A), such that the robotic arm 210 may be controlled to move laterally along track 220. Such lateral movement may allow robotic arm 210 to access larger storage facilities 120, and may also allow robotic arm 210 to transport drones 250 and/or drone platforms 240 among locations proximate to the track 220. Such locations may be associated with, for example, inspection system 130, payload system 140, equipment swapping system 150, and/or launch/landing system 160. In some implementations, robotic arm 210 may be attached to a fixed location, but a conveyance system may be included in drone handling system 110, such that robotic arm 210 may place a drone 250 or drone carrier 240 onto the conveyance system to enable transport to other locations. Such other locations may have robotic arms similar to robotic arm 210 which may move a drone or drone carrier between the conveyance system and the system(s) being engaged.

Inspection system 130 may include one or more mechanical and computing devices, as well as one or more sensor devices, to perform pre-flight and post-flight inspections of drone 250. For example, referring to FIG. 2B, inspection system 130 may include a surface 262 on which platform 240 may be placed, and one or more cameras 260 mounted on one or more supports 264 to allow cameras 260 to produce video data (e.g., images) of drone 250. In one implementation, a camera 260 and support 264 may rotate around surface 262 and camera 260 may elevate along a vertical portion of support 264 to provide a 360° field of view of drone 250. Although only one camera 260 is shown in FIG. 2B, in other implementations, inspection system 130 may include several cameras or a pan, tilt, zoom (PTZ) configuration to provide a 360° field of view of drone 250. Inspection system 130 may also incorporate other sensing devices, such as microphones, chemical sensors, vibration sensors, radio frequency antennas and detectors, and probing devices that may incorporate such sensing devices. Sensing devices (such as camera 260) are communicatively coupled to processing components to transmit sensor data (e.g., images) for reporting/processing.

Figure 4:
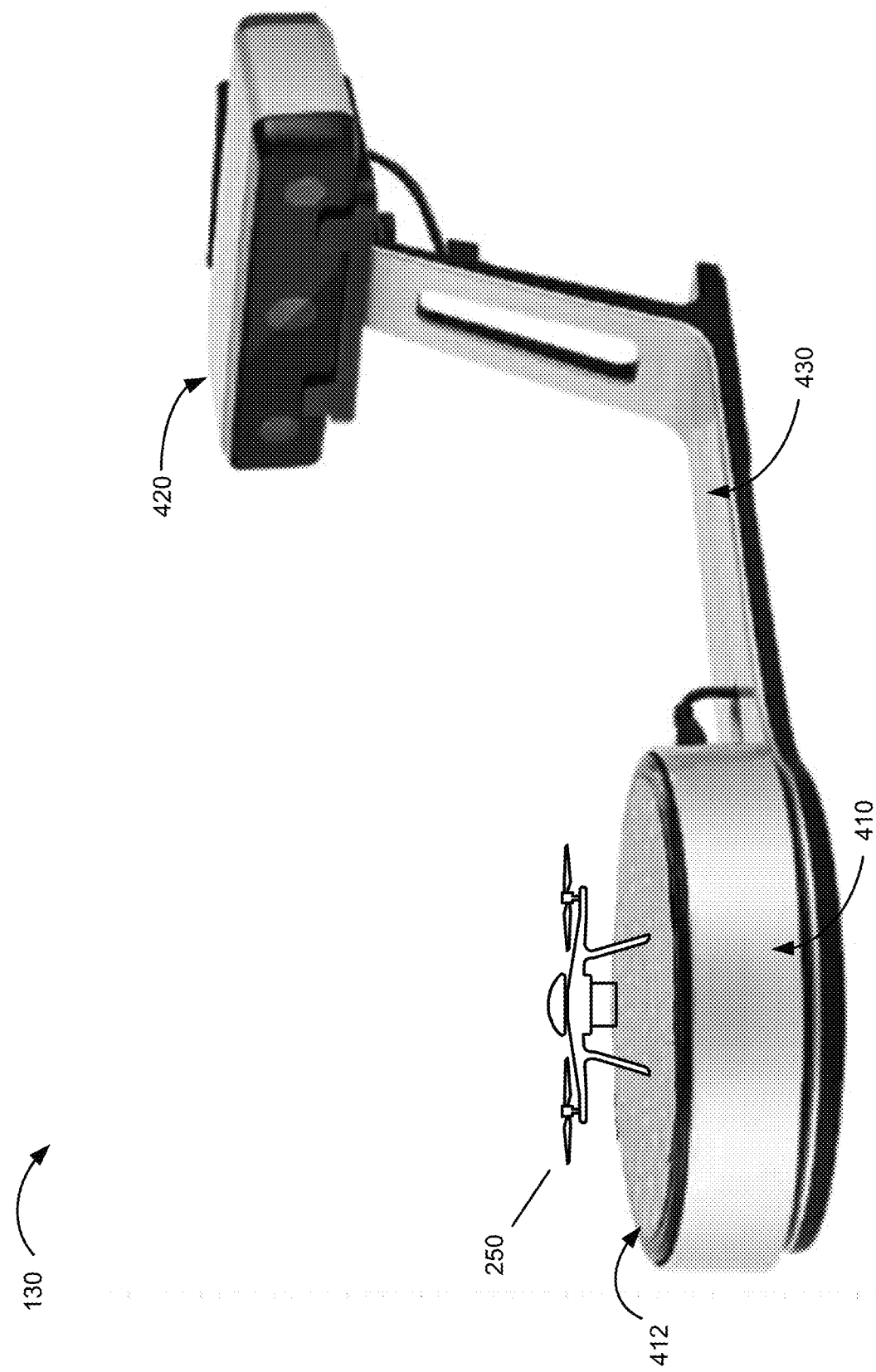
FIG. 4 illustrates an exemplary inspection system in accordance with an exemplary implementation.

FIG. 4 illustrates another example inspection system 130 that includes a base 410 with an upper surface 412 on which a drone 250 may be placed. This example inspection system 130 also includes a camera 420 (e.g., a high definition camera) mounted on a support 430. Base 410 may include a motor to allow base 410 to rotate and provide camera 420 with a 360° field of view of drone 250.

Inspection system 130 may also include or be connected to a controller or processor that executes inspection procedures to determine if drone 250 is fit for flying. For example, inspection system 130 may use computer vision techniques to process data from sensor devices (e.g., images from cameras 260, 420). Inspection system 130 may also execute machine learning techniques to determine if drone 250 is fit for flying. For example, based on a training set of images associated with flight-worthy drones 250 (which may be continuously updated over time with new models, configurations, etc.), and images received from inspection system 130, drone inspection system 130 may determine whether drone 250 is within the tolerances set for any variations from past acceptable visual inspections, and is therefore fit for flying. For example, inspection system 130 may determine that one of the propellers on drone 250 is not at a correct angle with respect to the body of drone 250, that one of the propellers is damaged, etc. Detection of an unfit drone 250 may trigger a notification to an operations center (e.g., drone operations system 170), a return of the drone 250 to the storage facility 120, a selection of a different drone 250 for use in a mission, or all of these actions. Inspection system 130 may also be used to ensure that drone 250 is the desired model of drone for a selected mission, for example, by using the identifier associated with drone 250 to determine if the images received from cameras correspond to expected visuals of the model associated with the identifier.

In some implementations, inspection system 130 may be implemented in multiple locations, and the sensor devices deployed to observe drone 250 may transmit collected data to a remotely located system, such as drone operations system 170, that executes computer vision and/or machine learning algorithms to determine whether drone 250 is in condition for flying. In some implementations, inspection system 130 may transmit sensor data (e.g., images) to operations center displays, such that personnel may observe a selected drone 250 and determine whether it is in condition for flying Payload system 140 may include one or more computer devices, processors and/or controllers to identify the appropriate payload for a drone 250. For example, in one implementation, payload system 140 may identify a payload that is scheduled for transport, and then identify a drone 250 to carry the payload. For example, payload system 140 may access information from storage facility 120 (or drone operations system 170) to identify a drone 250 of the proper capabilities to carry the payload. In one implementation, payload system 140 may use an identifier associated with a particular drone 250 to access records that identifies the size and/or payload carrying capability of drone 250, access a database storing payloads to be carried and schedules associated with the payloads, and select an appropriate drone 250 based on the particular payload and schedule. In some implementations, payload system 140 causes the payload to be delivered to the launch/landing system 160 according to the schedule, so that it can be added to the drone prior to launch.

Equipment swapping system 150 may include one or more mechanical and computing devices (e.g., processors, controllers and/or robotic arms) to change the equipment deployed on drones 250. For example, if inspection system 130 determines that drone 250 is missing a piece of equipment needed for a mission, the drone handling system 110 may be instructed to transport drone 250 to equipment swapping system 150 which is then instructed to install the needed equipment on drone 250. As another example, if inspection system 130 determines that a particular propeller is damaged or if drone 250 allows different sized propellers to be used for flights and drone 250 is being used for a longer distance/larger payload flight than a previous flight, equipment swapping system 150 may change the propeller. In some embodiments, equipment swapping system 150 may include a robotic arm to perform the needed equipment adjustments to drone 250. In other implementations, equipment swapping system 150 may signal robotic arm 210 to move drone 250 to a maintenance area to allow maintenance personnel to make the equipment adjustments.

Launch/landing system 160 may include components to allow drone 250 to be automatically transported to a launching area. For example, launch/landing system 160 may include a conveyor on which platforms 240 and drones 250 may be transported to a launching area. In some implementations, drone handling system 110 may position platform 240 and drone 250 into the launching area. Launch/landing system 160 may include sensors (e.g., optical sensors, trip sensors) that can detect when a drone 250 has entered the launching area, and provide signals (for example, to the drone operations system 170) indicating the drone 250 is ready for launch. In an exemplary implementation, after a launch of a drone 250, launch/landing system 160 may return the platform 240 that was used to carry drone 250 back to storage facility 120 via the conveyor and drone handling system 110. When launch/landing system 160 is informed (for example, from drone operations system 170) that a drone 250 is incoming for landing, launch/landing system 160 may cause a platform 240 to be positioned in the landing area. When the drone 250 lands, launch/landing system 160 may then transport platform 240 back to drone handling system 110 for return to storage facility 120. In some implementations, launch/landing system 160 may also include one or more robotic arms, which may be used to, for example, retrieve a drone from drone handling system 110, place a drone 250 into a launching area, retrieve a drone 250 that has landed in the launching area, place a drone 250 on a platform 240, and provide the platform 240 with the drone 250 to drone handling system 110 for transport to storage facility 120, as described in more detail below.

Drone operations system 170 may include one or more mechanical and computing devices (e.g., processors, controllers) that allow for communications with the various components of system 100, execution of command operations for such components and observation of information received from such components. Drone operations system 170 may use communications systems such as industrial networks (e.g., Ethernet/IP, Common Industrial Protocol, Modbus, etc.) to communicate with other components of system 100. Drone operations system 170 may include (or be in communication with) a data store that stores mission information for scheduled drone missions, as well as a data store of drone information associated with drones stored in storage facility 120, and one or more data stores that may store information received from other system components, such as storage facility 120, inspection system 130, payload system 140, equipment swapping system 150 and launch/landing system 160. Drone operations system 170 may execute operations to perform one or more of: determine assignments of drones in storage facility 120 to scheduled missions, instruct retrieval of a drone 250 for a mission, instruct inspection of a drone 250, instruct equipment swapping for a drone 250, instruct retrieval of a payload, instruct a launch of a drone 250, instruct a landing of a drone 250, instruct storage of a drone 250, and other operations as described above and further below. In some implementations, drone operations system 170 will include an operations center with user interface devices (e.g., displays, input devices) for use by drone operators, and will include facilities to generate user interfaces to show on such devices and/or receive inputs from operators.

Figure 5:
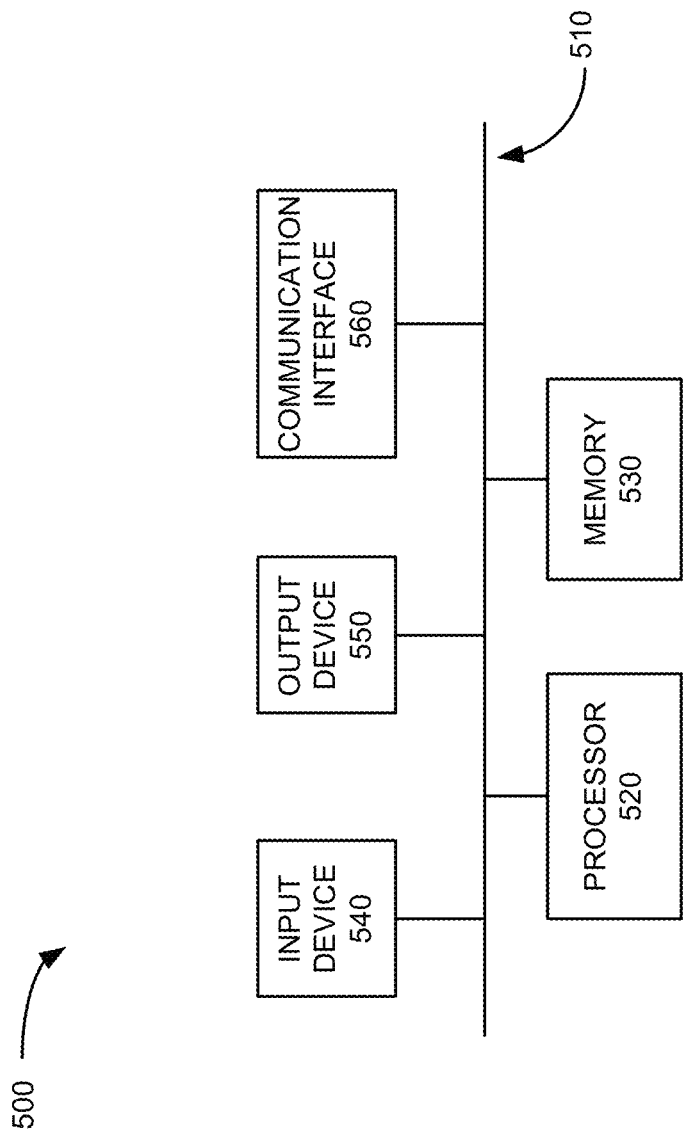
FIG. 5 is a diagram illustrating exemplary components of a device that may correspond to one or more of the devices and/or systems described herein.

FIG. 5 is a diagram illustrating exemplary components of a device 500 that may correspond to one or more of the systems described herein. For example, device 500 may correspond to components included in drone handling system 110, storage facility 120, inspection system 130, payload system 140, equipment swapping system 150, launch/landing system 160, drone operations system 170 and/or other elements illustrated in FIGS. 1-4 and/or are used in connection with drone management. For example, device 500 may include a device located remotely from system 100, such as a device included in an operations center associated with remotely managing drones 250.

Referring to FIG. 5, device 500 may include bus 510, processor 520, memory 530, input device 5240, output device 550 and communication interface 560. Bus 510 may include a path that permits communication among the elements of device 500

Processor 520 may include one or more processors, microprocessors, or processing logic that may interpret and execute instructions. Memory 530 may include a random access memory (RAM) or another type of dynamic storage device that may store information and instructions for execution by processor 520. Memory 530 may also include a read only memory (ROM) device or another type of static storage device that may store static information and instructions for use by processor 520. Memory 530 may further include a solid state drive (SSD). Memory 530 may also include a magnetic and/or optical recording medium (e.g., a hard disk) and its corresponding drive.

Input device 540 may include a mechanism that permits a user to input information, such as a keypad, a keyboard, a mouse, a pen, a microphone, a touch screen, voice recognition and/or biometric mechanisms, etc. Output device 550 may include a mechanism that outputs information to the user, including a display (e.g., a liquid crystal display (LCD)), a speaker, etc. In some implementations, device 500 may include a touch screen display may act as both an input device 540 and an output device 550.

Communication interface 560 may include one or more transceivers that device 500 uses to communicate with other devices via wired, wireless or optical mechanisms. For example, communication interface 560 may include one or more radio frequency (RF) transmitters, receivers and/or transceivers and one or more antennas for transmitting and receiving RF data. Communication interface 560 may also include a modem or an Ethernet interface to a LAN or other mechanisms for communicating with elements in a network.

The exemplary configuration illustrated in FIG. 5 is provided for simplicity. It should be understood that device 500 may include more or fewer devices than illustrated in FIG. 5. In an exemplary implementation, device 500 performs operations in response to processor 520 executing sequences of instructions contained in a computer-readable medium, such as memory 530. A computer-readable medium may be defined as a physical or logical memory device. The software instructions may be read into memory 530 from another computer-readable medium (e.g., a hard disk drive (HDD), SSD, etc.), or from another device via communication interface 560. Alternatively, hard-wired circuitry may be used in place of or in combination with software instructions to implement processes consistent with the implementations described herein. Thus, implementations described herein are not limited to any specific combination of hardware circuitry and software.

Figure 6:
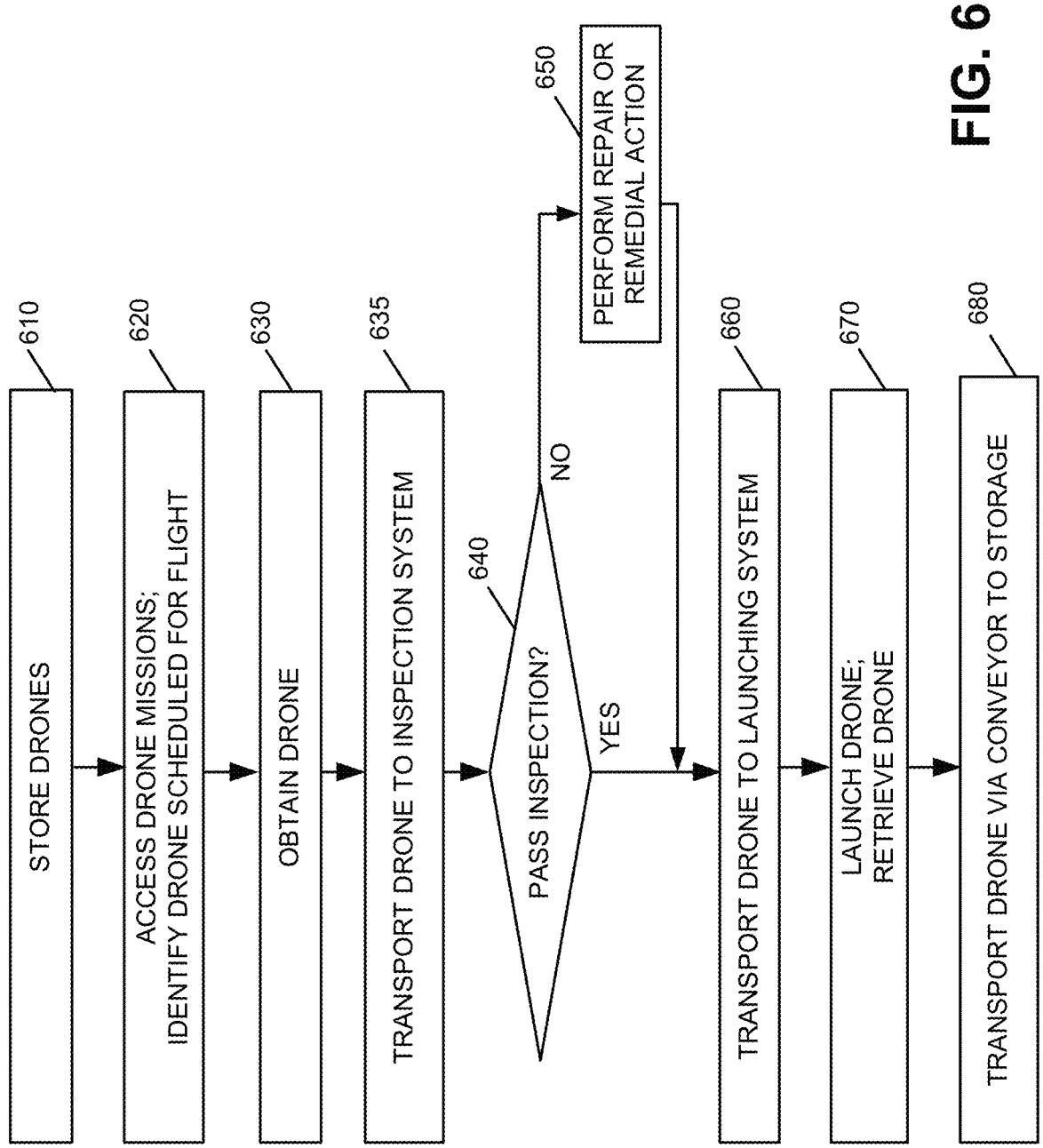
FIG. 6 is a flow diagram illustrating processing associated with drone management in accordance with an exemplary implementation.

FIG. 6 is a flow diagram illustrating processing associated with elements of system 100 to provide drone management in accordance with an exemplary implementation. Processing may begin with storing drones 250 in storage facility 120 (block 610). For example, storage facility 120 may include one or more storage systems, such as rack 230 or rack 310. As described above with respect to FIGS. 2A and 3, storage facility 120 may include a relatively small rack 230 configured to store a relatively small number of drones (e.g., less than 10), or a large rack 310 configured to store a large number of drones (e.g., 20, 50, 100, or more). Racks 230 and/or 310 may also be capable of storing drones 250 of various sizes.

Once drones 250 are stored, drone handling system 110 and/or storage facility 120 may store information identifying which storage spaces are storing drones 250, the particular drone 250 stored in each storage space, which storage spaces are empty, etc. For example, as noted above, drone handling system 110 may use detection equipment (e.g., optical scanners, RF transceivers) to detect and store information identifying the particular identifier, model and/or size of drones 250 stored in storage facility 120, and/or storage facility 120 may include detection equipment (e.g. cameras, RF transceivers) to detect and store information about occupancy status of storage locations in storage facility 120 and drones stored in storage facility 120. In some implementations, a fueling and/or recharging operation may be conducted for a stored drone 250 while present in storage facility 120, as described above.

System 100 may then access a database of drone missions to determine if any drone missions are scheduled, and identify a drone for a scheduled mission (block 620). For example, drone operations system 170, drone handling system 110, or another system may access a database that tracks information associated with scheduled drone missions, such as the date/time, payload information, flight plan, expected duration and the like. The database may be stored locally in drone operations system 170, drone handling system 110, or another portion of system 100, and/or may be stored remotely from system 100. In situations in which the database of flight plans is stored remotely, system 100 (e.g., via drone operations system 170, drone handling system 110, or another system) may retrieve the flight plans via a network (e.g., a wireless network, a wide area network, the Internet, etc.).

Drone operations system 170 may determine that a drone 250 stored in storage facility 120 should be used for a mission based on a drone mission in the database. In some implementations, a specific drone identifier may be included in the mission information, and drone operation system 170 may compare it to drone identifiers for drones 250 stored in storage facility 120 to see if any match exists. In some implementations, an identifier of a drone type/model/class may be included in the mission information, and drone operations system 170 may compare it to drone information for drones stored in storage facility 120 to see if any drones in storage match the type/model/class. In some implementations, drone operations system 170 may compare other mission information (e.g., date/time, payload information, expected duration) with drone information for drones stored in storage facility 120, and determine whether a stored drone 250 has capabilities that make it eligible for the mission. In each case, drone operations system 170 may also determine whether an eligible drone 250 has already been scheduled for a mission, and only select a drone 250 for a mission that is not already "reserved" for another mission. Once a drone 250 is identified for a mission, drone operations system 170 may "reserve" the drone for the mission, for example, by indicating in the drone information its assignment to a mission (e.g. using a mission identifier from the mission database, indicating a date/time of the mission, etc.).

System 100 may periodically determine whether it is time to start mission pre-plight preparations for a mission assigned to a drone 250. The amount of time to allocate to pre-flight preparations may be variable depending on the mission information, or in some implementations it may be a set threshold (e.g., 60 minutes prior to desired launch time). For a drone 250 with a mission determined to be within the pre-flight preparation period, drone operations system 170 may instruct drone handling system 110 to remove the selected drone 250 from storage facility 120, for example, by providing one or more instructions that identify the particular drone 250 with the upcoming flight.

Drone handling system 110 may obtain the drone 250 with the upcoming scheduled flight (block 630). For example, drone handling system 110 may map the identified drone 250 to a corresponding storage space in, for example, rack 230 or 310 in which the drone 250 is stored (e.g., identifies the particular opening 230A-C in rack 230 or the row 312 and column 314 of rack 310 in which drone 250 is stored). Drone handling system 110 may then provide signals to robotic arm 210 to cause it to articulate to the storage location of the drone 250 to be retrieved. Robotic arm 210 may retrieve the drone 250 from the appropriate location in rack 230/310 using its engagement mechanism. In some implementations, drone handling system 110 may send a signal to drone operations system 170 indicating successful retrieval of drone 250. Once drone 250 is removed from rack 230/310, that location/storage space may be registered by storage facility 120 as being empty.

Figure 7:
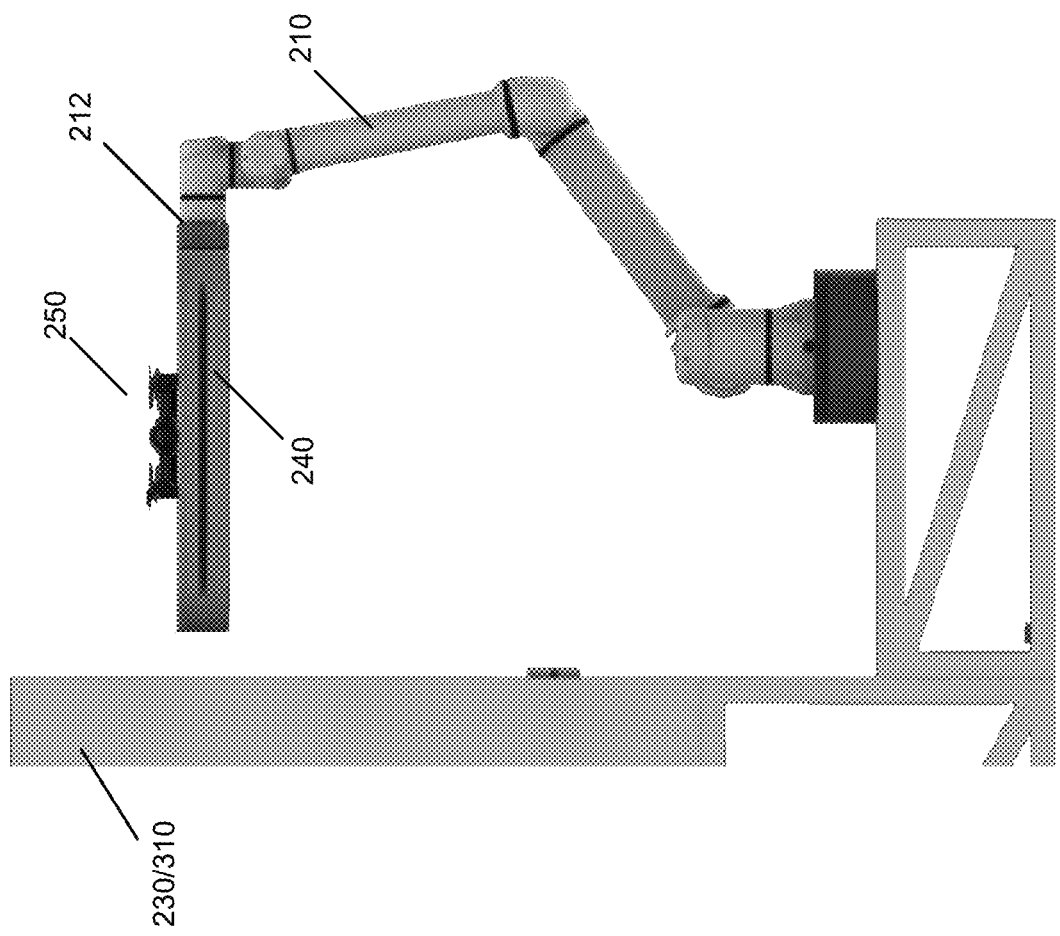
FIG. 7 illustrates components used to move a drone to/from storage associated with the processing of FIG. 6 in accordance with an exemplary implementation.

FIG. 7 illustrates robotic arm 210 retrieving a drone 250. Referring to FIG. 7, robotic arm 210 may be provided signals to cause it to articulate to position its end 212 to a position in storage facility 230/310 corresponding to a platform 240 carrying a drone 250. End 212 may engage with platform 240 and remove platform 240 from its storage location. In embodiments where robotic arm 210 is deployed on track 220 (such as shown in FIG. 2A), robotic arm 210 may be provided signals to move laterally on track 220 as well as articulate in order to engage with the appropriate opening or row/column of rack 230/310 and retrieve platform 240 on which drone 250 rests.

Figure 8:
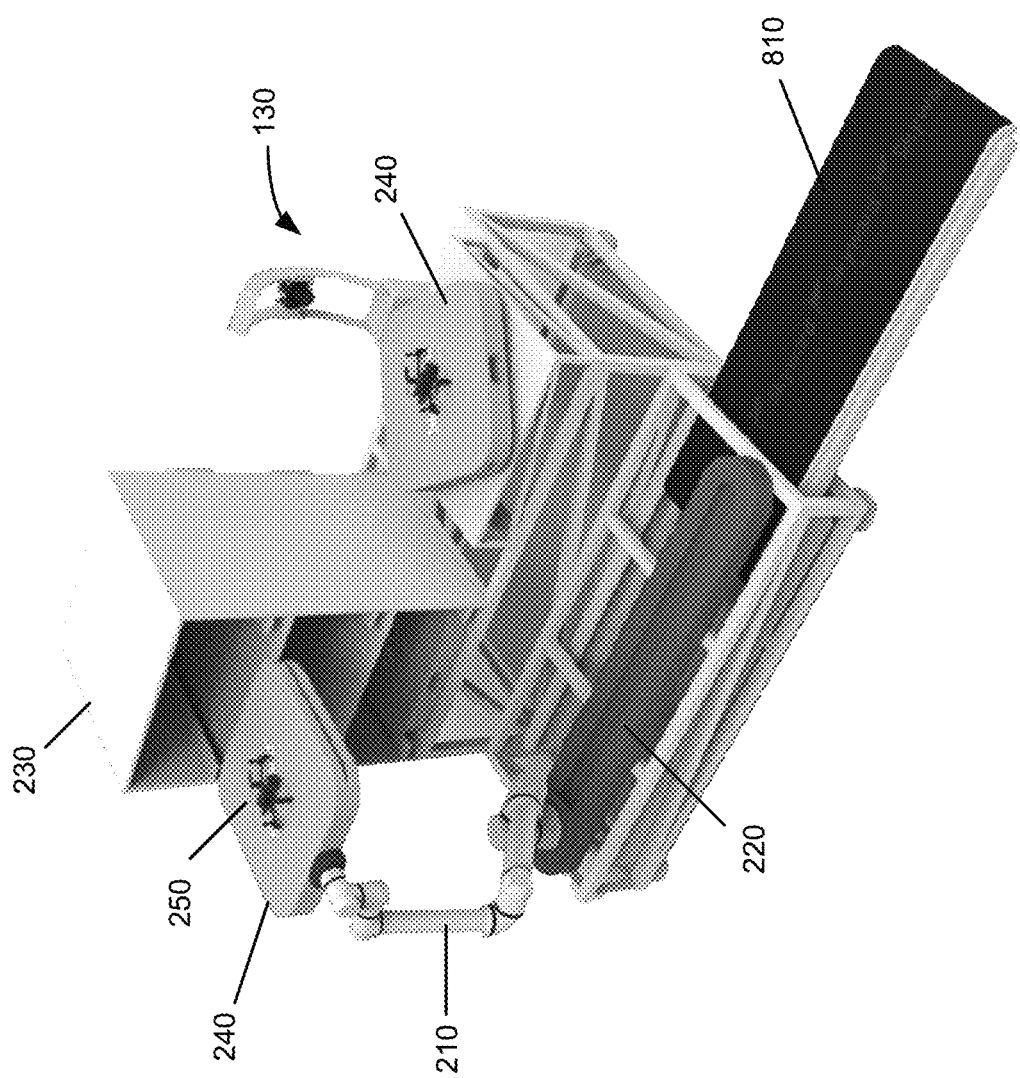
FIG. 8 illustrates components associated with the processing of FIG. 6 in accordance with an exemplary implementation.

In some implementations, drone operations system 170 may cause the selected drone 250 to be transported to inspection system 130 (block 635), where the drone 250 may undergo a pre-flight inspection. For example, instructions may be provided to drone handling system 110 to transport the retrieved drone 250 to inspection system 130, and drone handling system 110 may provide signals to robotic arm 210 to cause it to articulate such that platform 240 is positioned into an inspection area of inspection system 130. In implementations where robotic arm 210 is deployed on track 220, signals may be provided to robotic arm 210 to cause it to move along track 220 to a position proximate to inspection system 130 and place the retrieved drone 250/platform 240 in an inspection area of inspection system 130, such as illustrated in FIG. 8. In some implementations where drone handling system 110 includes a conveyor, such as conveyor 810, signals may be provided to robotic arm 210 to cause it to place platform 240 on the conveyor for transport to inspection system 130. Inspection system 130 may use its robotic arm to move platform 240 from the conveyor to the inspection area.

Inspection system 130 may then determine whether drone 250 passes the inspection (block 640). As described above with respect to FIG. 2B, inspection system 130 may include one or more sensor devices, such as camera 260. Once platform 240 with drone 250 are in the inspection area, instructions may be provided to inspection system 130 to have camera 260 start providing images (e.g., video) of drone 250. Inspection system 130 may provide signals to cause the movement of sensors, sensor mounts and/or the inspection area in order to obtain sensing data from different perspectives, such as the positional movement described above with respect to the examples shown in FIGS. 2B and 4. As discussed above, inspection system 130 may use computer vision and/or machine learning techniques to process data received from sensors of inspection system 130 (in the examples, image data from camera 260/420). Inspection system 130 may also determine whether drone 250 is fully charged by, for example, viewing or otherwise obtaining a battery status level indicator on drone 250. In other implementations, inspection system 130 may transmit images of drone 250 received from camera 260/420 to an operations center for display to personnel to determine whether drone 250 is in condition for flying.

If drone 250 does not pass inspection (block 640—no), drone operations system 170 may take a remedial action (block 650). For example, in some implementations, drone handling system 110 may be instructed to move platform 240 and drone 250 to equipment swapping system 150 to replace damaged equipment or add missing equipment. In some implementations, drone handling system 110 may be instructed to move platform 240 and drone 250 to a maintenance area to allow personnel to repair the drone 250. In some implementations, drone handling system 110 may be instructed to move drone 250 back to storage facility 120 (for example, if inspection system 130 determines that drone 250 is not adequately fueled or charged for the upcoming flight). In some implementations, drone handling system 110 may be instructed to retrieve another drone 250 from storage facility 120 to use as a replacement drone for the upcoming mission. In some implementations, a notification will be sent to an operations center, such as drone operations system 170, to indicate the inspection failure. In some implementations, a notation will be made in the drone information for the drone that the drone failed inspection, in some cases including information about the failure (e.g., date/time, reason). In some implementations, some or all of the previous remediation actions may be taken by drone operations system 170.

If drone 250 passes inspection by inspection system 130 (block 640—yes), drone handling system 110 may be instructed to transport drone 250 to launch/landing system 160 (block 660). For example, drone operations system 170 may be notified that drone 250 passes inspection, and may then instruct drone handling system 110 to transport drone 250 to launch/landing system 160. In some implementations, signals may be provided to robotic arm 210 to cause it to articulate to place the platform 240/drone 250 onto a loading area of launch/landing system 160. In implementations where robotic arm 210 is deployed on track 220, signals may be provided to robotic arm 210 to cause it to move along track 220 to a position proximate to launch/landing system 160 and place the platform 240/drone 250 onto a loading area of launch/landing system 160, such as illustrated in FIG. 8. In implementations where drone handling system 110 includes a conveyor, robotic arm 210 may place platform 240 on the conveyor for transport to launch/landing system 160, where its robotic arm may move the platform 240 from the conveyor to the loading area. In some implementations, such as the example depicted in FIG. 8, launch/landing system 160 may include a conveyer 810, and the loading area may comprise a portion of conveyor 810. Once the platform 240/drone 250 is placed in the loading area, launch/landing system 160 may be instructed to transport the drone to a launch/landing pad.

Figure 9:
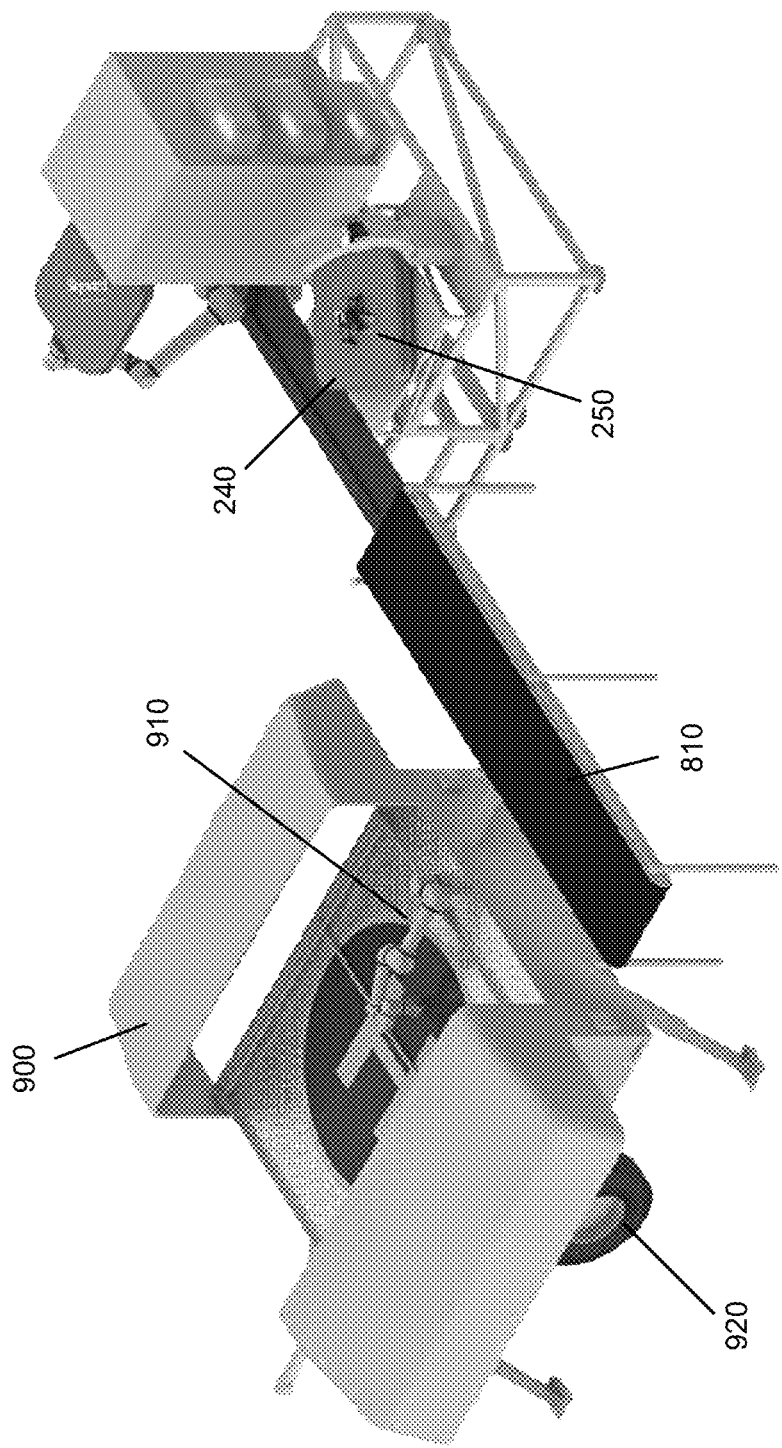
FIG. 9 illustrates components associated with launching a drone associated with the processing of FIG. 6 in accordance with an exemplary implementation.

For example, FIG. 9 illustrates an exemplary conveyor 810 that extends to launching pad 900, also referred to as drone pad 900. Referring to FIG. 9, conveyor 810 may transport platform 240 with a drone 250 to drone pad 900. At the end of the conveyor 810, a robotic arm 910 may remove the platform 240 from conveyor 810 and place platform 240 with drone 250 on the drone pad 900. In some implementations, robotic arm 910 may remove drone 250 from platform 240 and place drone 250 on drone pad 900. In some implementations, drone pad 900 may include a drive mechanism 920 (e.g., wheels, motors) to facilitate movement of drone pad 900. For example, after a drone 250 is placed on drone pad 900, drone pad 900 may be moved to an area for launching, and then moved back to the location adjacent the end of conveyor 810 after the launch. Launch/landing system 160 may include cameras or other sensing devices to detect when a drone 250 is positioned in the loading area, when the drone 250 is positioned on the drone pad 900, when the drone pad 900 is clear, etc. Sensor information may be sent to the drone operations system 170, for example, to allow operators to determine whether to perform a launch/landing. In accordance with an exemplary implementation, the launching pad 900 may be located on an upper level of a mobile trailer in which drones 250 are stored. In this implementation, the conveyor 810 may extend through an opening or hatch in the roof of the mobile trailer for launching. Alternatively, the conveyor may extend through a wall/door of the mobile trailer to a ground-based launching pad.

In an exemplary implementation, drone operations system 170 (or a system located remotely from system 100 that received information from drone operations system 170) may launch drone 250 at its scheduled time (block 670). For example, drone operations system 170 may provide instructions to drone 250 to start its propulsion systems and commence flight. Drone operations system 170 may also provide flight instructions and/or control drone 250 while in flight.

In some implementations, launch/landing system 160 may provide signals to robotic arm 910 to retrieve platform 240 after the launch and place platform 240 on conveyor 810. Conveyor 810 may be instructed to operate in a reverse direction to return platform 240 to drone handing system 110 so it can be reused. Alternatively, platform 240 may be stored in an area local to launch/landing system 160 so it may be used when drone 250 returns from the mission (or another drone 250 lands on drone pad 900). In some implementations, launch/landing system 160 may include a staging area where payloads may be attached to drone 250. For example, payload system 140 may cause a payload to be transported to launch/landing system 160 according to the mission information, where it can be loaded onto drone 250 (e.g. manually, by robotic arm, etc.).

After the drone 250 has completed its mission (e.g., dropped off a payload, used a camera to do video imaging, used sensors to make weather/atmospheric measurements, etc.), drone 250 may return to a landing area, such a drone pad 900. In advance of landing, drone operations system 170 may indicate to launch/landing system 160 that a drone is incoming for landing, and launch/landing system 160 may provide signals to robotic arm 910 to place a platform 240 in position on drone pad 900 to receive the incoming drone 250. Once drone 250 has landed and been turned off, robotic arm 910 may retrieve the drone 250 (block 670) and place it on conveyor 810 for return to storage facility 120 (block 680). In this manner, drone 250 may be returned to storage facility 120, be recharged and/or refueled and be ready for its next flight.

Figure 10:
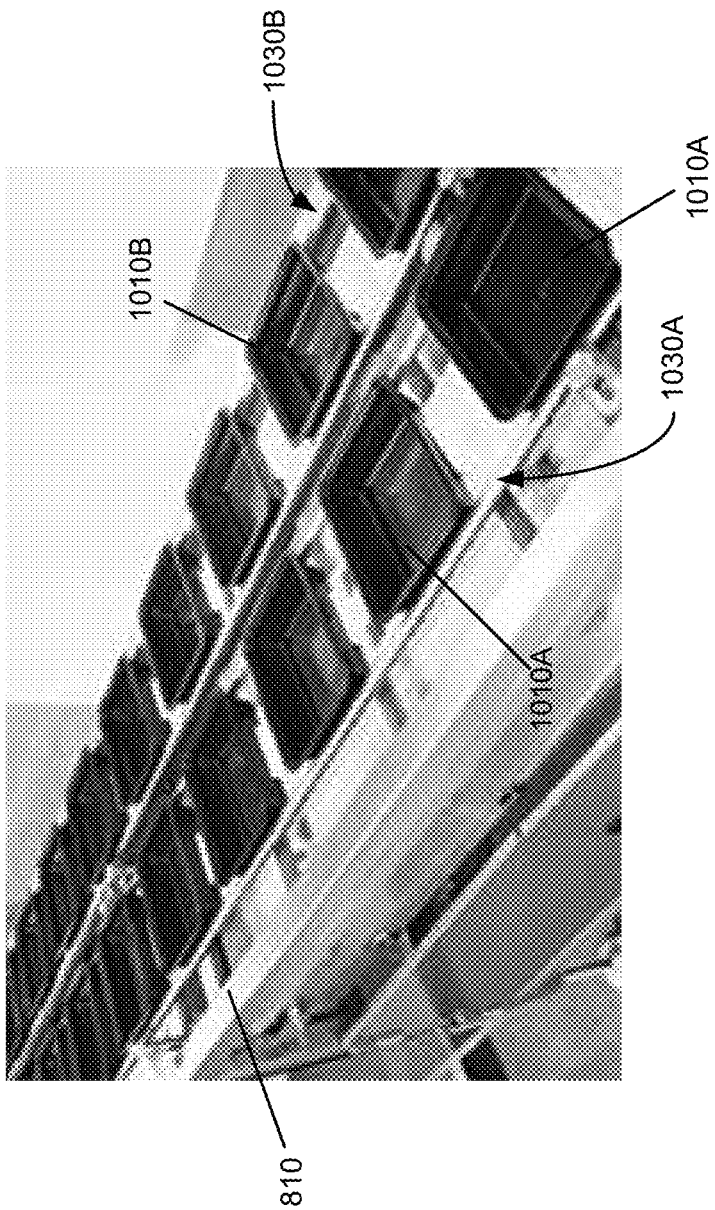
FIG. 10 illustrates a drone transport system in accordance with an exemplary implementation.

In some implementations, conveyors implemented herein (e.g., conveyor 810) may include one track that can move platforms 240 and/or drones 250 along a first path (such as from storage facility 120 to inspection system 130 and/or to launch/landing system 160) and another track that can move platforms 240 and/or drones 250 from launch/landing system 160 to inspection system 130 and/or storage facility 120. FIG. 10 illustrates an example of such an implementation. Platforms 1010 may be used to transport drones 250, and may be placed on a track 1030A or 1030B of conveyor 810 depending on a direction of travel. Referring to FIG. 10, track 1030A may transport platforms 1010A (which may contain drones 250) in a direction towards a launching pad (not shown). Track 1030B may transport platforms 1010B in a direction away from launch/landing system 160 and towards storage facility 120. The platforms 1010A and 1010B may be empty (i.e. not holding a drone 250), for example, when a platform is being returned to storage facility 120 after a launch, or when a platform is being sent to the launch/landing system 160 for use with a landing drone.

Implementations described herein provide for a fully automated, or a near fully automated system in which drones 250 can be operated and managed. The system may be provided as part of facilities that perform drone operations where management of multiple drones are needed, such as warehouses, food services facilities, emergency services facilities, drone operation facilities, and mobile command centers (e.g., a mobile vehicle). This may allow a large number of drones 250 to be launched in an efficient manner, resulting in increased flights as well as reduced personnel costs and overall operating costs. For example, in the case of a warehouse deployment, a drone storage facility 120 may be implemented as part of the warehouse, and a drone handling system 110 may be deployed to transport drones between storage facility 120 and launch/landing system 160 using various robotic arms and conveyors over distances required by the warehouse layout. The launch/landing system 160 may be implemented, for example, on a roof of the warehouse or adjacent an exterior wall of the warehouse, and the drone handling system may include inclined conveyors, elevators, or other mechanisms to perform transport. A payload system 140, if used, may be used to instruct warehouse automation systems to deliver payloads that are scheduled for delivery to the launch/landing system 160 for drone loading. An inspection system 130 and equipment swapping system 150, if used, may be implemented at locations along the drone handing system 110.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to number of discrete systems, such as drone handling system 110, storage facility 120, inspection system 130, payload system 140, equipment swapping system 150, launch/landing system 160 and drone operations system 170. In other implementations, these systems may be combined into one or more systems or with other systems.

In addition, features have been described above with respect to system 100 being automated such that little to no human personnel are required. In some implementations, one or more operating personnel may be located within the facilities in which system 100 is deployed to oversee and/or perform various tasks associated with drone management, such as performing equipment swapping, loading payloads, etc.

Further, while series of acts have been described with respect to FIG. 6, the order of the acts may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A system, comprising:
   a storage facility configured to store a plurality of drones placed on a plurality of carrier platforms;
   at least one robotic element including an articulating arm that includes an engagement member configured to interface with a receiving member of the carrier platforms upon which to move the plurality of drones to and from the storage facility, an inspection station, and a conveyor of the system;
   the inspection station including at least one camera configured to capture a plurality of images or video data of a first drone to be used to determine whether the first drone is eligible for assignment to a scheduled flight mission; and
   the conveyor configured to move the first drone to a launching area upon a determination that the first drone is eligible for the assignment.

2. The system of claim 1,
   wherein a contacting surface of the plurality of platforms includes one or more retention areas configured to retain contacting portions of the plurality of drones.

3. The system of claim 2, wherein the contacting surface includes cooperating elements configured to receive the contacting portions.

4. The system of claim 1,
   wherein the engagement member is further configured to removably insert into a second receiving member of the plurality of drones.

5. The system of claim 1, further comprising:
   a communication interface configured to receive the captured images or video data; and
   a controller configured to determine whether the first drone is eligible for the scheduled flight mission based on the captured images or video data.

6. The system of claim 1, further comprising:
   a drone handling system, wherein the drone handling system is configured to:
      identify a replacement drone among the plurality of drones, in response to determining that the first drone is not eligible for the assignment, and
      signal the at least one robotic element to transport the replacement drone to the inspection station.

7. The system of claim 1, further comprising:
   an electrical charging station, wherein at least some of the plurality of drones are charged while in the storage facility via inductive charging.

8. The system of claim 1, further comprising:
   a refueling station, wherein at least some of the plurality of drones are refueled prior to storing in the storage facility.

9. The system of claim 1, further comprising:
   at least one second robotic element comprising an articulating arm configured to retrieve the first drone after a completion of the scheduled flight mission.

10. The system of claim 1, further comprising:
    a second conveyor configured to return the first drone to the storage facility after completion of the scheduled flight mission.

11. The system of claim 1, wherein the storage facility comprises a storage rack, wherein the storage facility is configured to:
    identify empty spaces in the storage rack to be used for some of the plurality of drones returning from scheduled flight missions, and
    control charging of the returning drones in the rack.

12. The system of claim 1, further comprising:
    the plurality of drones.

13. A method, comprising:
    storing a plurality of drones in a storage facility, wherein the plurality of drones are placed on a plurality of carrier platforms;
    selecting a first one of the plurality of drones for assignment to a scheduled flight mission;
    moving, via at least one robotic element including an articulating arm, the first drone from the storage facility to a conveyor, by inserting an end of the articulating arm into an opening in a first one of a plurality of carrier platforms on which the first drone is placed, to enable the end to engage the first platform and move the first platform carrying the first drone; and
    moving, via a conveyor, the first drone from the storage facility to a launching area.

14. The method of claim 13, further comprising:
    positioning cooperating elements on a first contacting surface of the plurality of drones in one or more retention areas on a second contacting surface of the carrier platforms.

15. The method of claim 13, further comprising:
inspecting, via images captured from at least one camera, the first drone prior to the assignment to a scheduled flight mission; and
determining, based on the images, whether the first drone is eligible for assignment to the scheduled flight mission.

16. The method of claim 15, further comprising:
identifying a replacement drone in response to determining that the first drone is not eligible for assignment to the scheduled flight mission; and
signaling the at least one robotic element to transport the replacement drone to an inspection station.

17. The method of claim 13, further comprising:
inductively charging at least some of the plurality of drones while the plurality of drones are in the storage facility.

18. The method of claim 13, wherein the moving the first drone to the launching area comprises:
transporting, via the conveyor, the first drone to an opening, door or hatch in a mobile vehicle in which the storage facility is located.

19. The method of claim 13, further comprising:
retrieving, via a second robotic element, the first drone after a completion of the scheduled flight mission; and
returning, via a second conveyor, the first drone to the storage facility after the completion of the scheduled flight mission.

20. A non-transitory computer-readable medium having stored thereon sequences of instructions which, when executed by at least one processor, cause the at least one processor to:
monitor a plurality of drones in a storage facility, wherein the plurality of drones are placed on a plurality of carrier platforms;
instruct at least one robotic element including an articulating arm to move a first one of the plurality of drones from the storage facility to an inspection station;
inspect, via images from at least one camera, the first drone prior to assignment to a scheduled flight mission;
determine, based on the images, whether the first drone is eligible for assignment to the scheduled flight mission; and
instruct, the at least one robotic element, to move the first drone from the inspection station to the conveyor, in response to determining that the first drone is eligible for assignment to the scheduled flight mission, by inserting an end of the articulating arm into an opening in a first one of a plurality of carrier platforms on which the first drone is placed, to enable the end to engage the first platform and move the first platform carrying the first drone.

* * * * *